(12) United States Patent
Fleming et al.

(10) Patent No.: US 10,442,452 B2
(45) Date of Patent: Oct. 15, 2019

(54) TRANSPORT VEHICLE ACCESSORY LOCKING MECHANISMS

(71) Applicant: Thule Canada Inc., Granby (CA)

(72) Inventors: Wesley Justin Fleming, Granby (CA); Matthew Stengler, Granby (CA)

(73) Assignee: Thule Canada Inc., Granby (CA)

( * ) Notice: Subject to any disclaimer, the term of this patent is extended or adjusted under 35 U.S.C. 154(b) by 27 days.

(21) Appl. No.: 15/529,422

(22) PCT Filed: Nov. 19, 2015

(86) PCT No.: PCT/IB2015/058988
§ 371 (c)(1),
(2) Date: May 24, 2017

(87) PCT Pub. No.: WO2016/083963
PCT Pub. Date: Jun. 2, 2016

(65) Prior Publication Data
US 2017/0361860 A1    Dec. 21, 2017

Related U.S. Application Data

(60) Provisional application No. 62/085,102, filed on Nov. 26, 2014.

(51) Int. Cl.
*B62B 7/04* (2006.01)
*B62B 7/12* (2006.01)

(52) U.S. Cl.
CPC .............. *B62B 7/046* (2013.01); *B62B 7/126* (2013.01); *B62B 2205/104* (2013.01)

(58) Field of Classification Search
CPC ......... B62B 7/044; B62B 7/046; B62B 7/126; B62B 2205/10; B62B 2205/104;
(Continued)

(56) References Cited

U.S. PATENT DOCUMENTS 4,953,667 A     9/1990  Bigo
5,267,744 A *  12/1993  Berry .................... B62B 7/04
                                                         280/204

(Continued)

FOREIGN PATENT DOCUMENTS

CA    2 304 410 A1    4/2001
CA    2 559 638 A1    3/2008
(Continued)

OTHER PUBLICATIONS

International Search Report and Written Opinion issued in International Application No. PCT/IB2015/058988, dated Mar. 1, 2016.

*Primary Examiner* — Katy M Ebner

(74) *Attorney, Agent, or Firm* — Sterne, Kessler, Goldstein & Fox P.L.L.C.

(57) ABSTRACT

A transport vehicle including one or more accessory connectors for releasably locking one or more vehicle accessories to the transport vehicle. An accessory connector may releasably lock a first accessory within a first slot defined by the accessory connector and a second accessory within a second slot defined by the accessory connector. In some embodiments, the accessory connector may simultaneously releasably lock the first accessory and the second accessory within the first and second slots, respectively. The accessory connectors facilitate simple, quick, and easy attachment and detachment of vehicle accessories so that the transport vehicle may be easily converted between different modes of use.

20 Claims, 14 Drawing Sheets

(58) Field of Classification Search
CPC .......... B62B 9/12; B62B 9/147; B62B 9/005; B62B 9/15; B62B 9/245; B62B 9/26
See application file for complete search history.

(56) References Cited

U.S. PATENT DOCUMENTS

| | | | |
|---|---|---|---|
| 6,056,306 A | 5/2000 | Rust et al. | |
| 6,193,252 B1 * | 2/2001 | Lin | B62B 7/12 280/204 |
| 6,212,733 B1 * | 4/2001 | Yeh | B60B 33/0002 16/35 R |
| 6,443,467 B1 * | 9/2002 | Black | B62B 7/046 280/47.38 |
| 6,705,628 B2 | 3/2004 | Kahmann | |
| 7,364,171 B2 * | 4/2008 | Hu | B60B 1/006 280/47.38 |
| 7,547,029 B2 * | 6/2009 | Britton | B62B 7/12 280/204 |
| 7,766,359 B2 * | 8/2010 | Klevana | B62K 27/12 280/204 |
| 8,002,363 B2 * | 8/2011 | Cheng | B60B 33/0002 16/30 |
| 8,382,149 B1 * | 2/2013 | Liu | B62B 7/126 280/47.38 |
| 8,678,424 B2 * | 3/2014 | Fleming | B62B 7/126 280/642 |
| 8,695,992 B2 * | 4/2014 | Piaget | B62B 5/0079 280/1.5 |
| 9,315,206 B2 * | 4/2016 | Fleming | B62K 13/00 |
| 9,908,552 B2 * | 3/2018 | Fleming | B62K 27/02 |
| 2007/0240279 A1 * | 10/2007 | Tan | B60B 1/006 16/44 |
| 2008/0067787 A1 | 3/2008 | Britton et al. | |
| 2008/0143076 A1 * | 6/2008 | Klevana | B62B 7/062 280/402 |
| 2010/0283228 A1 * | 11/2010 | Ehrenreich | B60B 33/0002 280/647 |
| 2015/0251065 A1 * | 9/2015 | Wu | B62B 3/12 280/149.1 |

FOREIGN PATENT DOCUMENTS

| | | | |
|---|---|---|---|
| CA | 2 208 809 | 5/2009 | |
| CA | 2 790 657 A1 | 1/2014 | |
| CN | 201012702 Y | 1/2008 | |
| CN | 201712653 U | 1/2011 | |
| EP | 1764282 A2 * | 3/2007 | ............ B62B 7/068 |

* cited by examiner

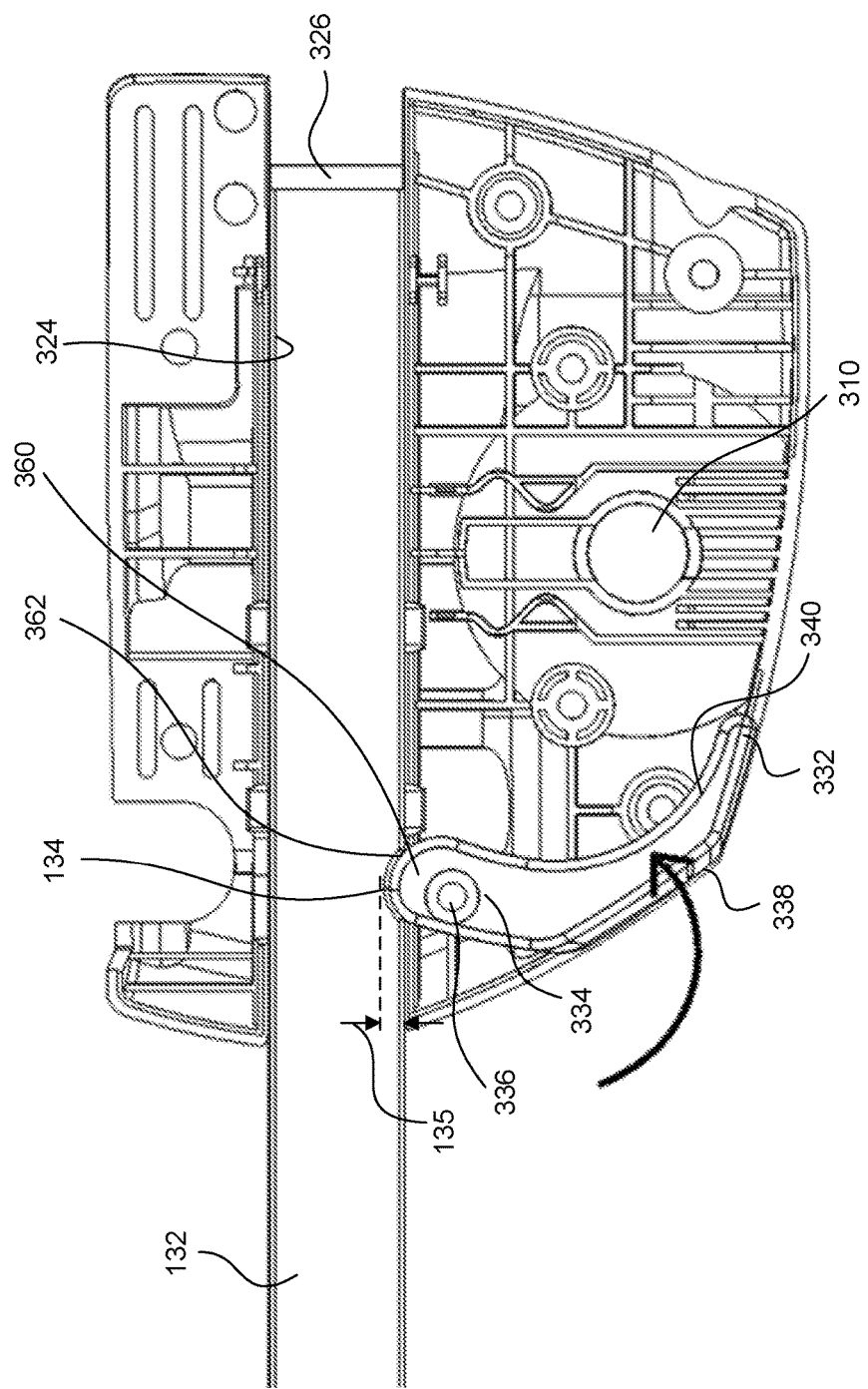

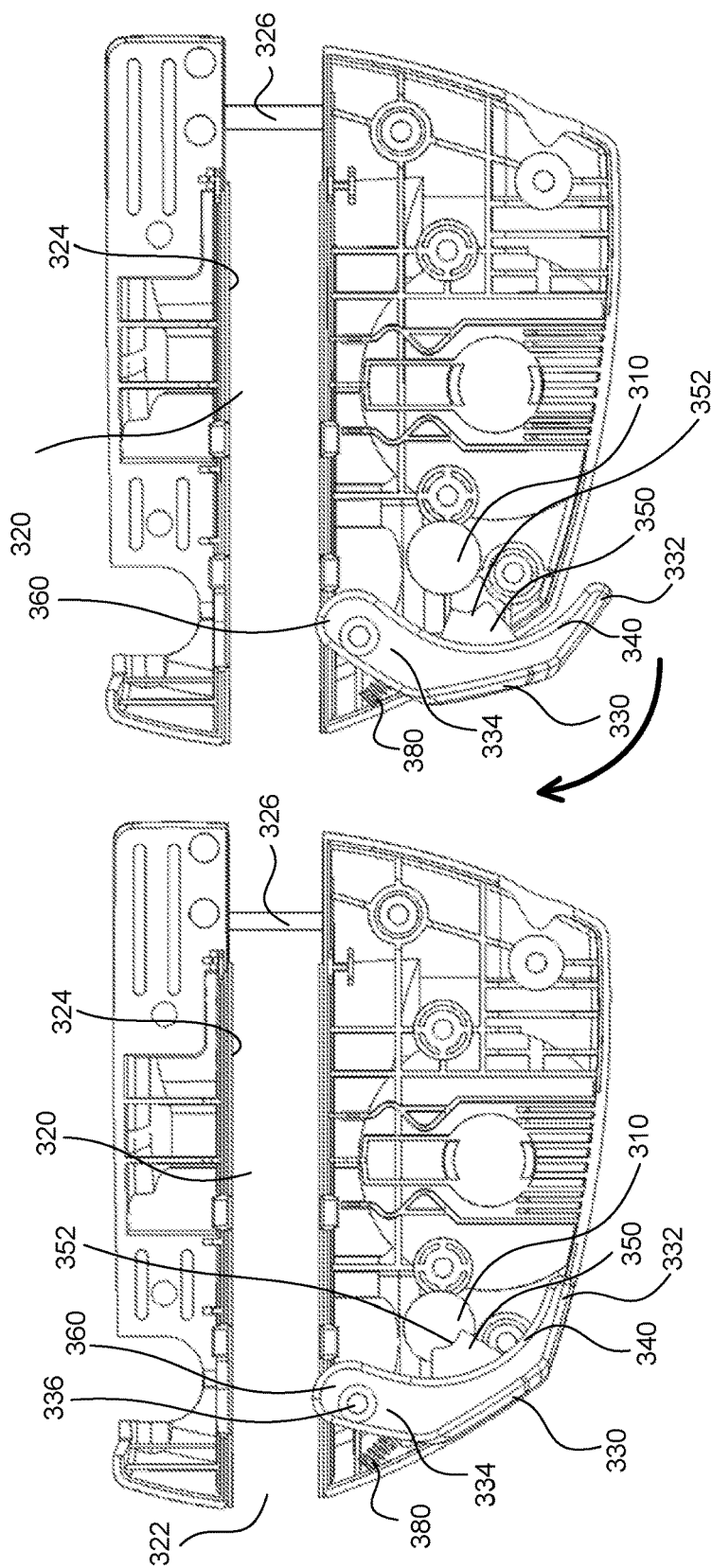

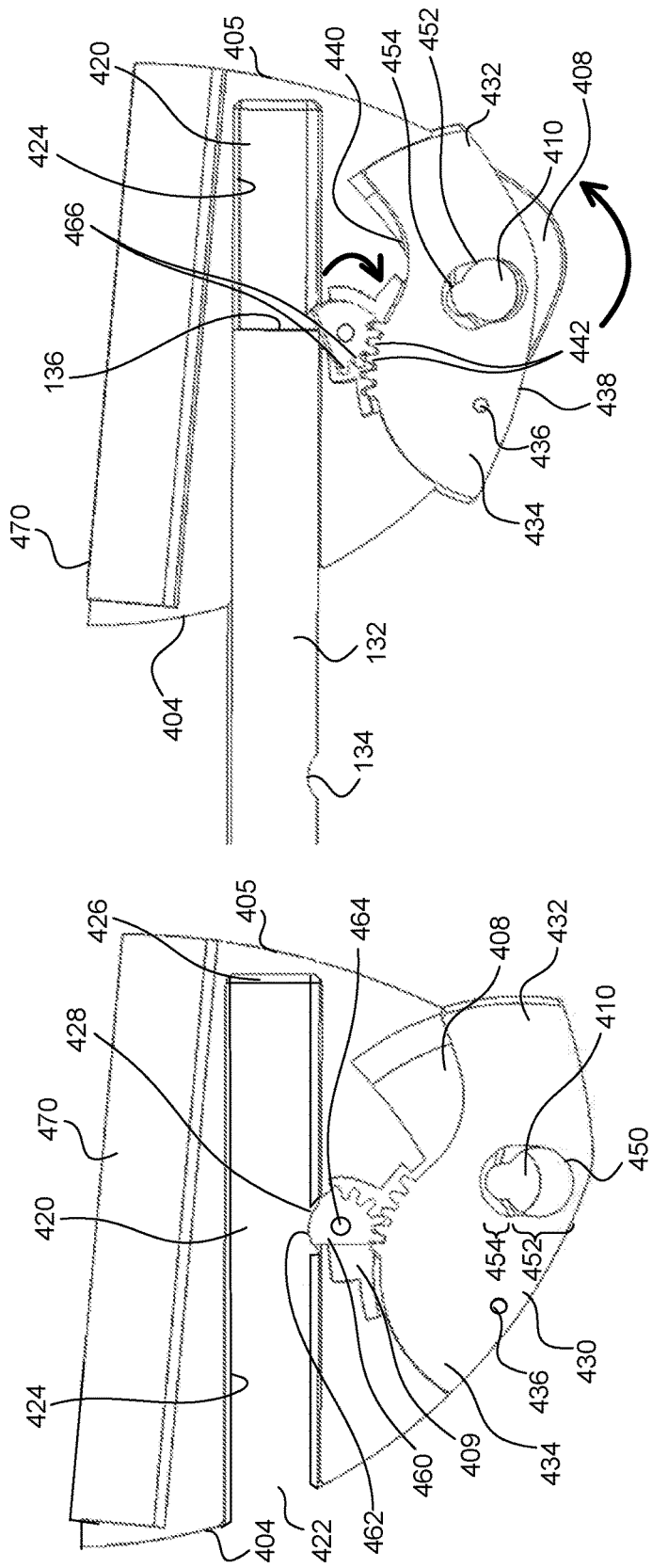

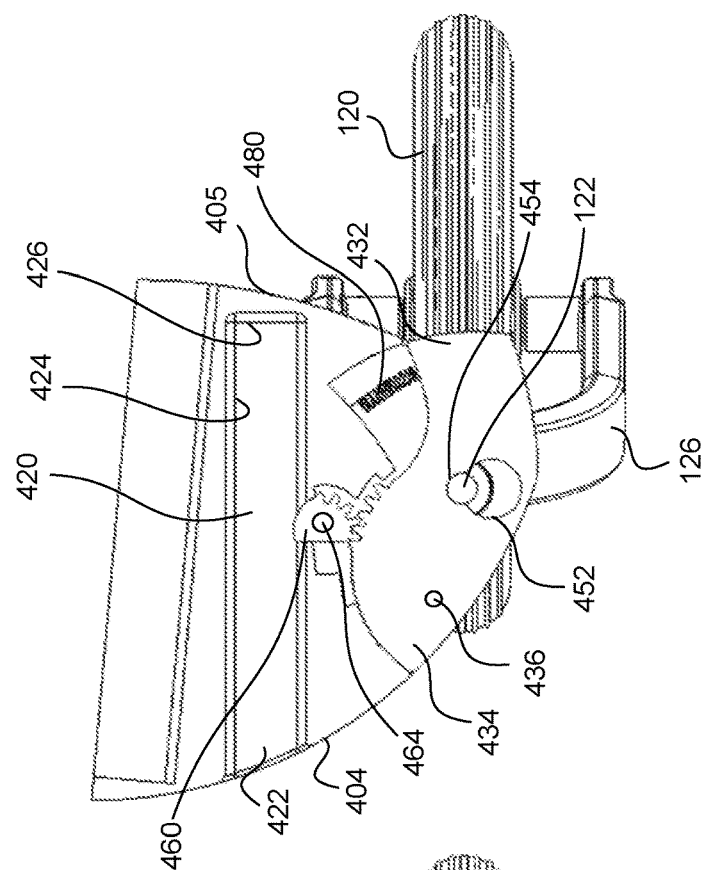
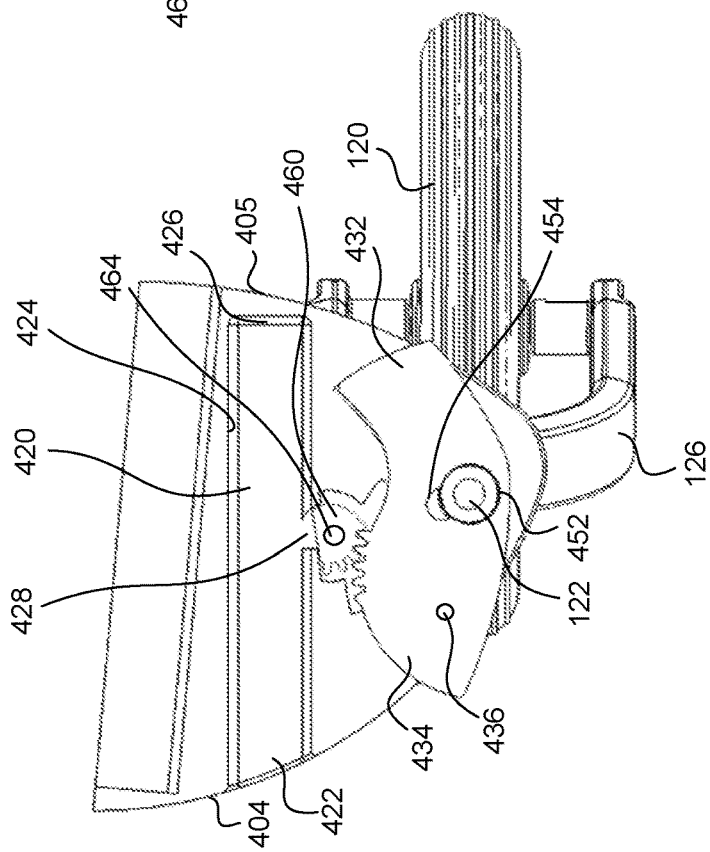
FIG. 12B
FIG. 12A

TRANSPORT VEHICLE ACCESSORY LOCKING MECHANISMS

BACKGROUND

Field

Embodiments of the present invention generally relate to transport vehicles intended to be convertible between different transport modes. In particular, embodiments relate to accessory connectors for transport vehicles having releasable locking mechanisms that allow for the conversion between different transport modes.

Background

Child transport vehicles, such as strollers, and trailers for towing as a wagon and/or by bicycles, hikers and skiers, are known in the art. Such child transport vehicles can be useful for carrying small children.

To enhance the functionality of these vehicles, some have been adapted for conversion between strollers and trailers by interchanging front stroller wheels and towing arms on a vehicle frame. Some child carriers have been provided with transport conversion connectors to allow the user to interchange components.

BRIEF SUMMARY OF THE INVENTION

Some embodiments are directed towards a child transport vehicle including a vehicle frame and an accessory connector attached to the vehicle frame, the accessory connector including a first slot configured to receive a portion of a first accessory, a second slot configured to receive a portion of a second accessory, and an actuator configured to releasably lock the portion of the first accessory in the first slot and releasably lock the portion of the second accessory in the second slot.

In some embodiments, the actuator is configured to simultaneously releasably lock the portion of the first accessory in the first slot and releasably lock the portion of the second accessory in the second slot.

In some embodiments, the actuator includes a lever having an anchored end pivotally attached to the accessory connector about a pivot point and a free end. In some embodiments, the lever is configured to rotate about the pivot point between a first position and a second position, and the lever is configured to lock the portion of the first accessory in the first slot and the portion of the second accessory in the second slot when the lever is in the first position. In some embodiments, the lever includes a first locking pin configured to releasably lock the portion of the first accessory in the first slot and a second locking pin configured to releasably lock the portion of the second accessory in the second slot. In some embodiments, the second locking pin is connected to the lever via a coupling. In some embodiments, the coupling is pivotally connected to the second locking pin.

In some embodiments, the first slot includes a first aperture configured to receive a portion of the first locking pin and the second slot includes a second aperture configured to receive a portion of the second locking pin.

Some embodiments are directed to a child transport vehicle including a vehicle frame and an accessory connector attached to the vehicle frame, the accessory connector including a housing defining a first slot configured to receive a portion of a first accessory and a lever assembly pivotally connected to the housing. The lever assembly may be configured to releasably lock the portion of the first accessory in the first slot. The lever assembly may also include a lever and a locking cam, where the lever is configured to rotate between a first position and a second position, where the locking cam is configured to protrude into the first slot when the lever is in the first position so as to lock the portion of the first accessory in the first slot, and where the locking cam is configured to force the portion of the first accessory against the housing when the lever is in the first position to thereby stabilize the first accessory.

In some embodiments, the locking cam is configured to move out of the first slot when the lever is in the second position so as to unlock the portion of the first accessory in the first slot.

In some embodiments, the lever assembly also includes an elastic member configured to bias the lever in the first position.

In some embodiments, the lever assembly also includes one or more knobs configured to engage one or more recesses disposed on the housing when the lever is in the first position.

In some embodiments, the housing further defines a second slot configured to receive a portion of a second accessory. In some embodiments, the lever assembly also includes a locking pin configured to releasably lock the portion of a second accessory in the second slot.

In some embodiments, the locking cam is configured to engage a detent in the portion of the first accessory when the first accessory is received in the first slot and the lever is in the first position. In some embodiments, the engagement between the locking cam and the detent biases the lever towards the first position and biases an end of the portion of the first accessory towards a stop wall of the first slot, and any movement of the end of the portion of the first accessory away from the stop wall increases the bias of the lever towards the first position.

In some embodiments, the locking cam is integrally formed with the lever and defines at least a portion of the lever.

In some embodiments, the lever is pivotally connected to the housing about a first pivot point and the locking cam is pivotally connected to the housing about a second pivot point. In some embodiments, the locking cam is a geared locking cam having a first set of teeth and the lever includes a second set teeth configured to engage the first set of teeth on the geared locking cam, where the lever is configured to actuate the geared locking cam by rotating between the first and second positions.

Some embodiments are directed towards a child transport vehicle including a vehicle frame defining a cargo area having a child passenger seat and an accessory connector attached to the vehicle frame, the accessory connector including a housing defining a first slot having a side wall configured to receive a portion of a first accessory and a second slot configured to receive a portion of a second accessory, and a lever includes a first lock configured to releasably lock the portion of the first accessory in the first slot and a second lock configured to releasably lock the portion of the second accessory in the second slot. The lever may be configured to rotate between a first position and a second position and the first lock may be configured to force the portion of the first accessory against the sidewall of the first slot when the lever is in the first position to thereby stabilize the first accessory.

BRIEF DESCRIPTION OF THE DRAWINGS

The accompanying drawings, which are incorporated herein and form a part of the specification, illustrate embodiments and, together with the description, further serve to explain the principles of the embodiments and to enable a person skilled in the relevant art(s) to make and use the embodiments.

FIGS. 8A-8C show the operation of an accessory connector from a locked position, to an unlocked position, to a locked position according to an embodiment.

FIGS. 9A and 9B show the operation of an accessory connector from a locked position to an unlocked position according to an embodiment.

FIGS. 11A-11C show the operation of an accessory connector from a locked position, to an unlocked position, to a locked position according to an embodiment.

FIGS. 12A and 12B show the operation of an accessory connector from an unlocked position to a locked position according to an embodiment.

Figure 1:
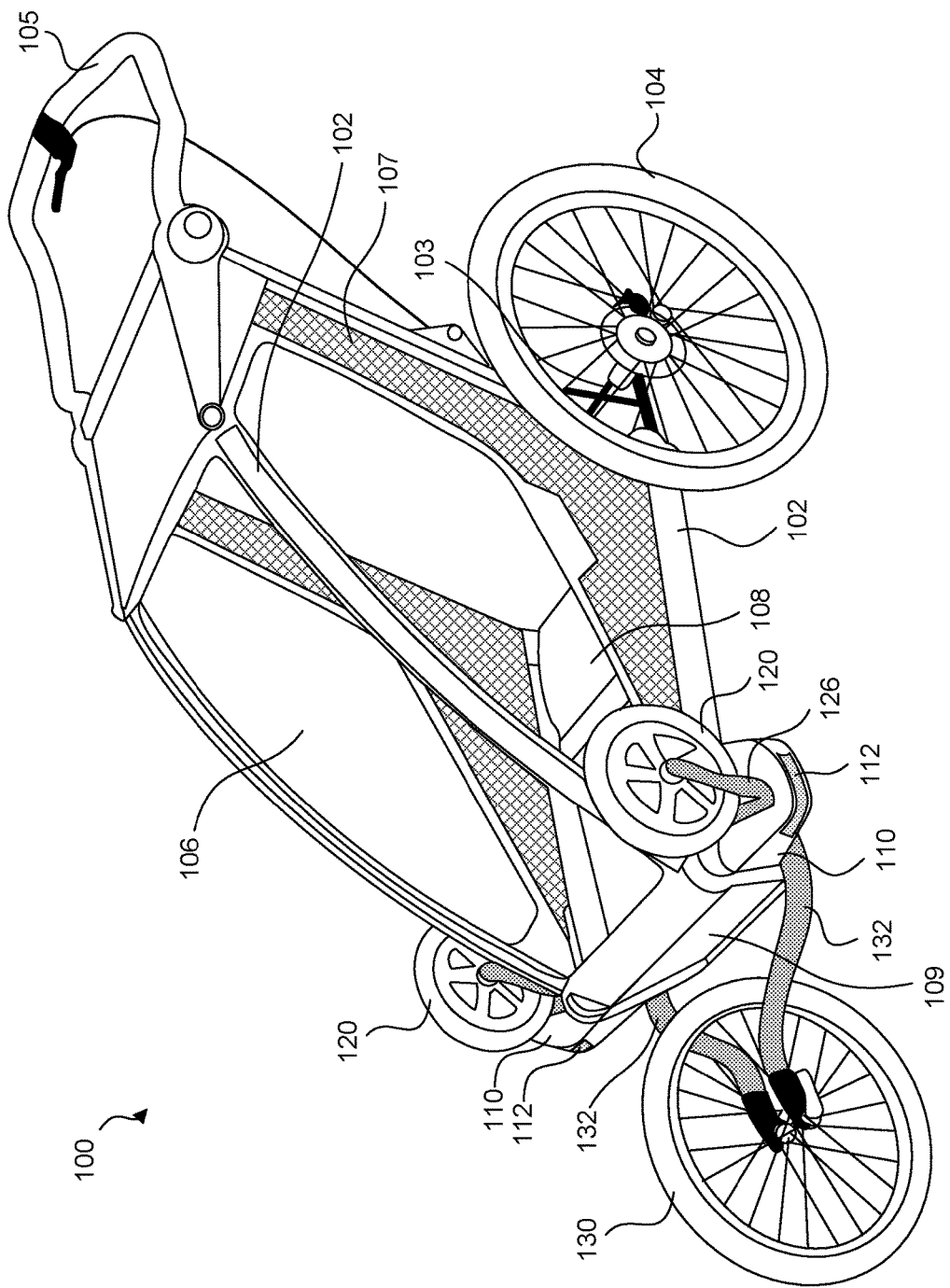
FIG. 1 shows a front perspective view of a transport vehicle according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

The present invention will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

With reference to FIG. 1, in one embodiment a transport vehicle 100 may include a frame 102 defining a cargo area 106 for transporting cargo. One or more accessory connectors 110 may be attached to frame 102 for releasably attaching one or more accessories to frame 102. In some embodiments, transport vehicle 100 may include two accessory connectors 110 (as shown, for example, in FIG. 1). Each accessory connector 110 may be configured to receive a portion of a first accessory (e.g., a portion of a strolling wheel 120) and releasably lock the portion of the first accessory to the accessory connector 110. Each accessory connector 110 may also be configured to receive a portion of a second accessory (e.g., a portion of a support wheel 130) and releasably lock the portion of the second accessory to the accessory connector 110. In some embodiments, each accessory connector 110 may include a first slot and a second slot configured to receive the portion of the first accessory and the portion of the second accessory, respectively. Each accessory connector 110 may also include an actuator 112 configured to actuate one or more locks that releasably lock the portion of the first accessory in the first slot and releasably lock the portion of the second accessory in the second slot. In some embodiments, actuator 112 and the locks for each accessory connector 110 are configured to simultaneously releasably lock the portion of the first accessory and releasably lock the portion of the second accessory in the first and second slots, respectively.

The transport vehicle 100 according to embodiments of the present invention may transport one or more types of cargo, including, but not limited to people (such as, for example, children), pets, and supplies. Often times a user may desire a transport vehicle that is convertible between different modes of use (e.g., different transport modes). This may be achieved by, for example, a vehicle that is convertible between several different configurations through the use of different removable accessories. Such removable vehicle accessories may allow the vehicle to be used in different scenarios, such as, for example, a walk around town, a jog, a walk on the beach, a bike ride, a trek through the snow, etc. While convertibility may be desirable, conversions between different transport modes should not be difficult for a user. Conversions between different transport modes that are simple, quick, and easy may be beneficial for a user. Quick and simple conversions not only make the vehicle user friendly, but may also facilitate the disassembly of vehicle accessories for storage (e.g., during different seasons or during travel in a car or an airplane).

Additionally, while quick and simple attachment for removable accessories provides a user with a number of flexible options, the removable nature of these accessories should not compromise the structural integrity and/or safety of the transport vehicle. This may be of particular concern when the transport vehicle is being used to transport children. Moreover, accessory connectors designed with safety and/or structural features that are not highly dependent on the dimensional tolerances of the components of the accessory connector and/or the accessories themselves may make attachment and detachment of the accessories easy for a user. And may also decrease manufacturing costs.

The accessory connectors according to the present invention facilitate simple, quick, and easy attachment and detachment of accessories to a transport vehicle via one or more releasable locking mechanisms. As a result, a single transport vehicle can be fitted with selected removable accessories and the time and effort, as well as potential difficulties, associated with removing and attaching an accessory may be decreased. In some embodiments, the accessory connectors allow the simultaneous attachment or detachment of multiple accessories from the transport vehicle. This may be achieved by one or more locks configured to lock and unlock accessories when actuated by an actuator, such as a lever.

The accessory connector may releasably lock a variety of removable accessories to the transport vehicle including, but not limited to, a front wheel or a support arm thereof, a bicycle trailer hitch arm, a caster, a ski, a hiking or skiing harness arm, a wagon pull arm, a bumper, and a fender. The accessory connector may also store an accessory when that accessory is not being used. The storage feature of the accessory connector may allow the accessory to remain attached to the accessory connector in a non-operable position. This may simplify the storage and transportation of different and/or replacement removable accessories. The accessory connector may also include one or more safety and/or structural features configured to ensure the integrity of the attachment between the accessory connector and one or more removable accessories and prevent inadvertent unlocking of the removable accessories.

FIG. 1 shows transport vehicle 100 according to an embodiment. Transport vehicle 100 includes a frame 102 that is sized and constructed to form a cargo area 106, which can accommodate a passenger, such as a child. In one embodiment, frame 102 comprises aluminum tubing. Frame 102 can be formed of any suitable material such as, for example, polymer material, metal, or wood, and may be provided as rods, tubing, bars, sheets, or other suitable structural members. Frame 102 may include or support various other features such as a passenger seat 108, fabric covering 107, and storage bins, for example. Frame 102 may be formed in various ways with various configurations of structural members. A handle 105 may be provided in some embodiments to aid in manual pushing of transport vehicle 100.

Elements for moving vehicle 100, such as a pair of wheels 104, may be pivotally mounted on frame 102, for example, on an axle 103 of frame 102. Other wheel configurations, and other elements, such as skis or blades (not shown) can be used in place of or in addition to wheels 104. In some embodiments, these elements may be mounted to frame 102 in a removable fashion to permit conversion between transport modes and to reduce the size of the vehicle for storage.

As shown in FIG. 1, one or more accessory connectors 110 for removably attaching and retaining vehicle accessories may be attached to frame 102 of transport vehicle 100. Accessory connectors 110 can be disposed in various locations on frame 102. Accessory connectors 110 permit removable vehicle accessories 120/130 to be secured to transport vehicle 100 and may even hold some vehicle accessories (e.g., strolling wheels 120) when the accessories are not being used. Removable vehicle accessories may include, but are not limited to strolling wheels 120 (shown in a stored position in FIG. 1 and in an operable position in FIG. 2), a support wheel 130, a wagon pull arm (not shown), which can alternately be installed in another configuration to operate as a bicycle hitch arm, a hiker/skier harness arm, a front acting U-shaped member forming a front bumper, ski side bumpers, fenders, and other suitable vehicle accessories including those described in U.S. Pat. No. 7,547,029, entitled "Child Transport Vehicle," the disclosure of which is incorporated herein in its entirety by reference thereto.

Figure 2:
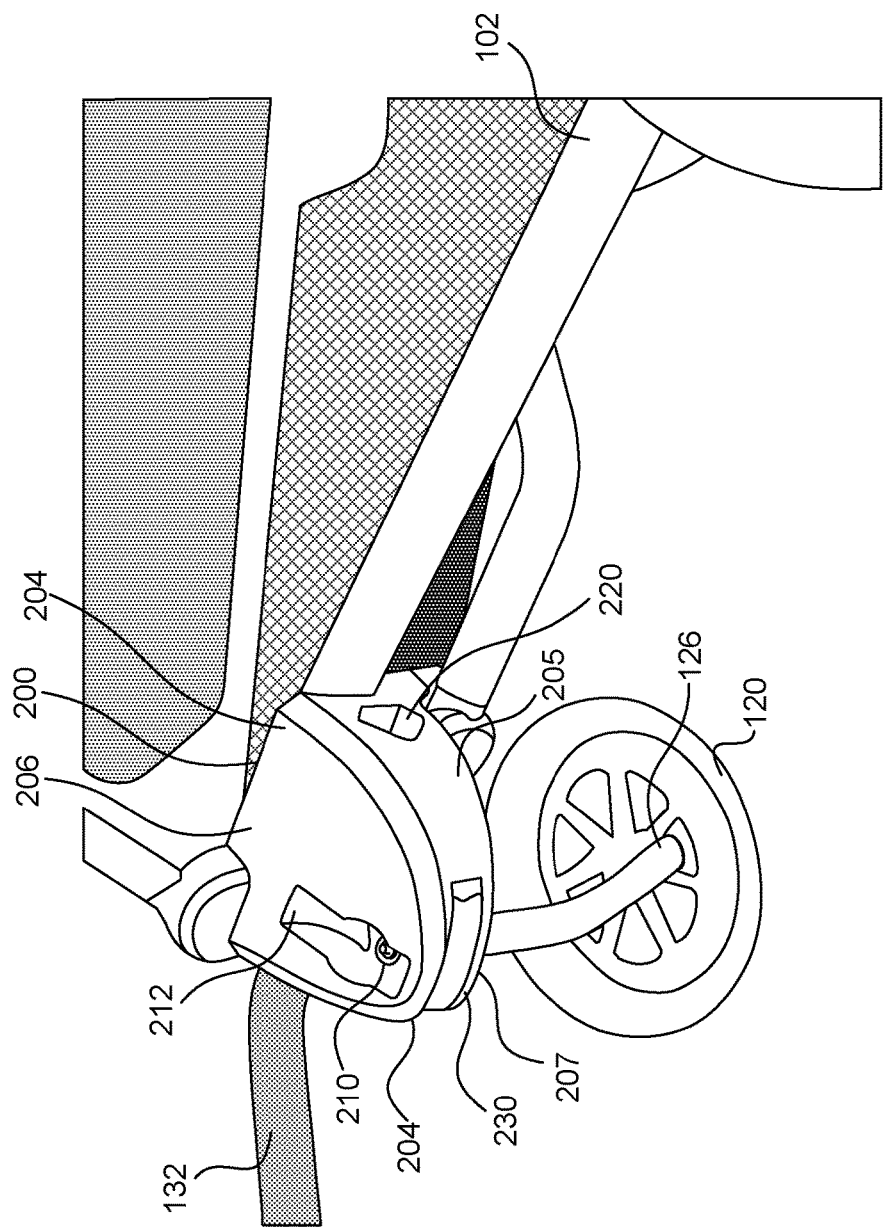
FIG. 2 shows a perspective view of an assembled accessory connector according to an embodiment.

In some embodiments, accessory connectors 110 may be positioned on both sides of transport vehicle 100 adjacent a front bottom end 109 of transport vehicle 100 opposite wheels 104, as shown in FIG. 1. For example, as shown in FIG. 1, accessory connectors 110 may be disposed at a forward position of the cargo area 106 at the front left and right sides of vehicle 100. While FIG. 1 shows an exemplary configuration and location for accessory connectors 110, accessory connectors 110 may be attached to any portion of frame 102 and in any suitable configuration so long as removable vehicle accessories may be disposed in operable positions when secured to accessory connectors 110 (e.g., strolling wheels 120 being disposed so as to freely rotate while also supporting frame 102 above the ground, as shown in FIG. 2). In one embodiment, one or more accessory connectors 110 may be disposed at a position rearward of the cargo area 106. In one embodiment, one or more accessory connectors 110 may be disposed at a centralized position relative to the cargo area 106 such that the accessory connectors 110 are not disposed at a side of vehicle 100.

As shown in FIG. 1, accessory connector 110 also includes an actuator 112 configured to releasably lock a portion of a first accessory (e.g., strolling wheel 120) to accessory connector 110 and releasably lock a portion of a second accessory (e.g., support wheel 130) to accessory connector 110. In some embodiments, actuator 112 is configured to simultaneously releasably lock a portion of a first accessory and a portion of a second accessory to accessory connector 110. Actuator 112 may be a mechanical actuator, including, but not limited to, a lever (e.g., levers 230, 330, and 430), a push type actuator (e.g., a spring-loaded push button), or a switch. In some embodiments, actuator 112 may be an electrically operated mechanical actuator. For example, actuator 112 may include a capacitance touch sensor or electronic switch configured to operate actuator 112 when activated by a user.

Accessory connector 110 may include one or more locks operably connected to actuator 112 for releasably engaging and locking a portion of a first accessory to accessory connector 110 and releasably engaging and locking a portion of a second accessory to accessory connector 110. Locks may include, but are not limited to, locking pins (e.g., locking pins 250 and 350) and locking cams (e.g., locking cams 360 and 460).

FIGS. 2-6 show an accessory connector 200 according to an embodiment. Accessory connector 200 may include a housing 202 defining a first slot 210 and a second slot 220. Slot 210 may be configured to receive an accessory arm 122 of strolling wheel 120 and slot 220 may be configured to receive accessory arm 132 of support wheel 130. Accessory connector 200 may be connected to frame 102 of transport vehicle 100 at a mounting area 270 via one or more mounting supports 272 located on housing 202. Mounting supports 272 may include any suitable mechanism for securing accessory connector 200 to frame 102 including, but not limited to friction fittings, screws, rivets, or adhesives. In some embodiments, accessory connector 200 may be welded to frame 102. In some embodiments, accessory connector 200 may be formed integrally with frame 102. For example, accessory connector 200 may be molded as part of frame 102. Housing 202 may comprise any suitable material, including but not limited to, a plastic, a metal (e.g., aluminum) a composite (e.g., a carbon fiber composite), or combinations thereof.

Slot 210 may extend at least partially through housing 202 from a bottom 207 of housing 202 towards at top 206 of housing 202 (e.g., in a direction generally perpendicular to the travel surface of transport vehicle 100). In some embodiments, slot 210 is a through-hole extending through housing 202 from bottom 207 of housing 202 to top 206 of housing 202. In some embodiments, at least one of top 206 and bottom 207 of housing 202 may include an indentation 212 located around slot 210 and being sized and shaped to receive a portion of strolling wheel 120. For example, indentation 212 may be sized and shaped to receive all or a portion of a mounting bracket 126 of strolling wheel 120. In such embodiments, indentation 212 may serve to properly position strolling wheel 120 on accessory connector 200 when arm 122 is inserted into slot 210.

FIG. 2 shows strolling wheel 120 disposed in an operative position with arm 122 inserted into slot 210 through bottom 207 of housing 202. But, strolling wheel 120 may also be disposed in a storage position with arm 122 inserted into slot 210 through top 206 of housing 202 (e.g., as illustrated in FIG. 1). The mounting and locking of arm 122 into slot 210 is described below with reference to FIGS. 4-6. Slot 210 may have any suitable shape for receiving arm 122, including, but not limited to, a circular shape, a polygonal shape, or an elliptical shape. Preferably, slot 210 has a shape corresponding to the general exterior shape of arm 122.

Slot 220 may extend at least partially through housing 202 from a proximal side 204 of housing 202 to a distal side 205 of housing 202 (e.g., in a direction generally parallel to the travel surface of transport vehicle 100). In some embodiments, slot 220 may be a through-hole extending through housing 202 from proximal side 204 of housing 202 to distal side 205 of housing 202. In some embodiments, slot 220 may be an elongated opening having an open end 222 located on proximal side 204 of housing and a closed end terminating within housing 202. In such embodiments, an end 136 of arm 132 may abut the closed end of slot 220 so as to properly align arm 132 within slot 220. In some embodiments, slot 220 may include a stop wall (e.g., similar to stop wall 326 described below in more detail) for properly aligning arm 132 within slot 220. In some embodiments, slot 220 may be separate and isolated from slot 210 within housing 202. In other embodiments, slots 220 and 210 may be in communication within housing 202.

Figure 4:
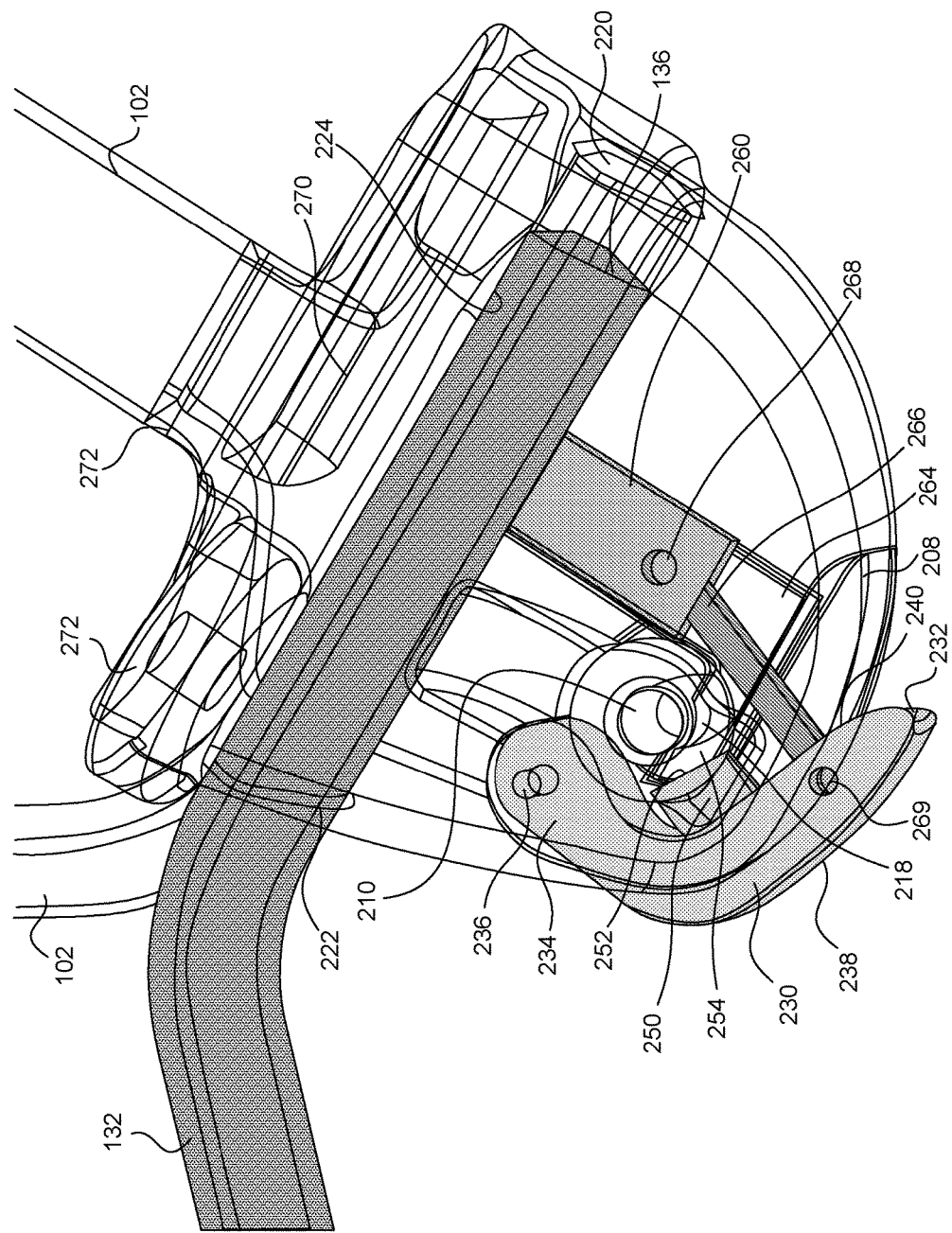
FIG. 4 shows a phantom top perspective view of an accessory connector in an unlocked position according to an embodiment.
Figure 5:
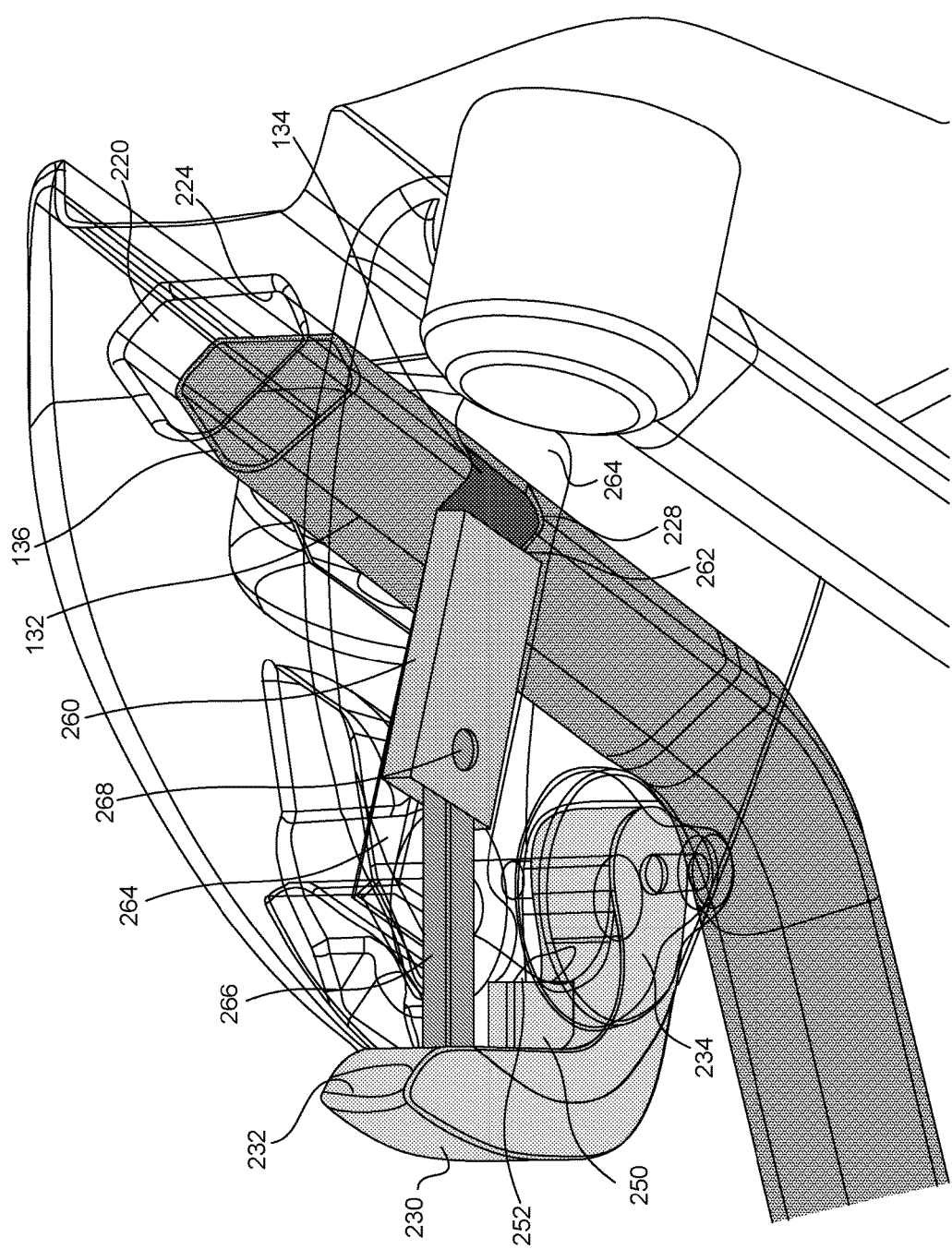
FIG. 5 shows a phantom bottom perspective view of an accessory connector in an unlocked position according to an embodiment.
Figure 6:
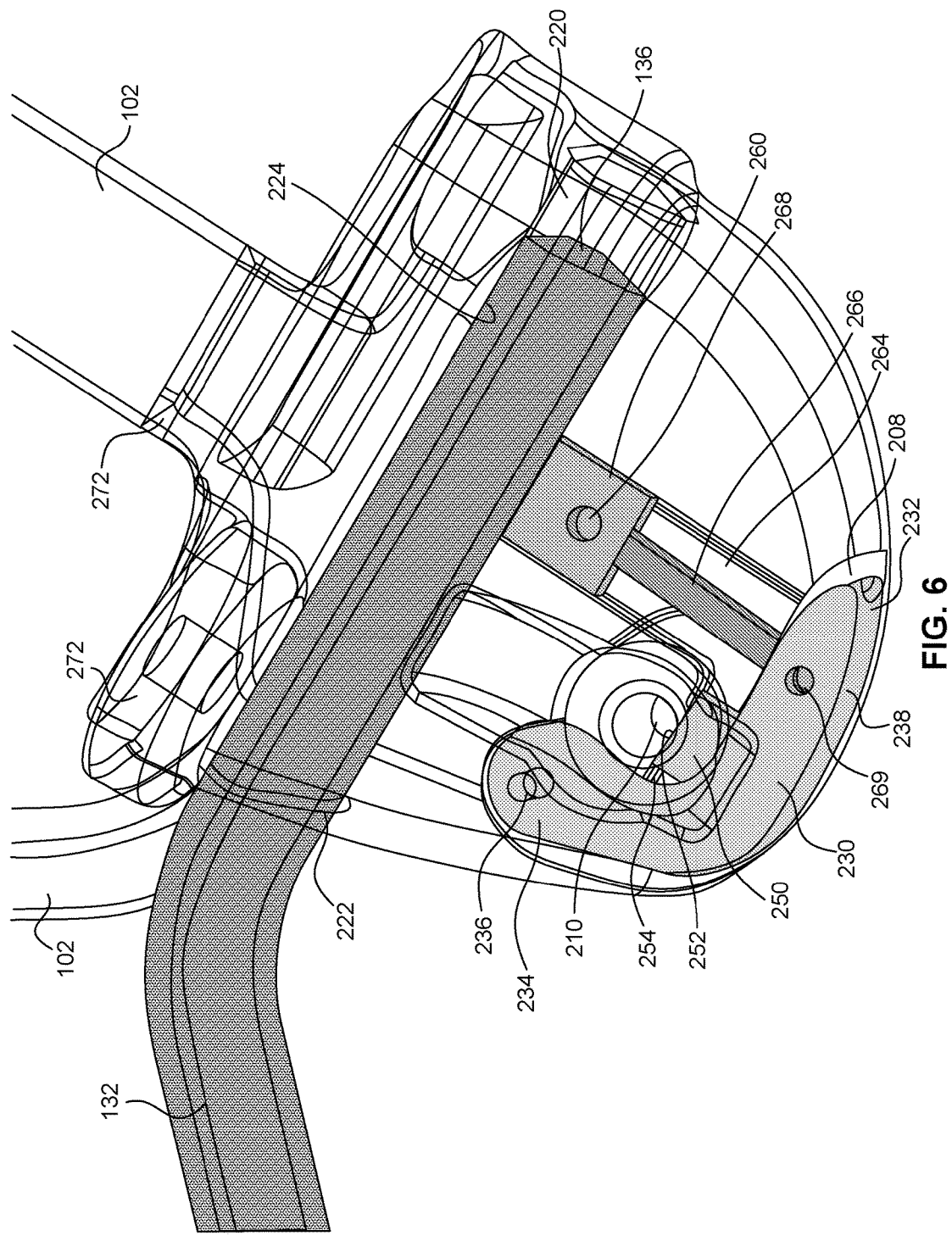
FIG. 6 shows a phantom top perspective view of an accessory connector in a locked position according to an embodiment.

A side wall 224 of slot 220 may have any suitable internal shape for receiving arm 132, including but not limited to, a circular shape, a polygonal shape, or an elliptical shape. Preferably, side wall 224 has an internal shape corresponding to the general exterior shape of arm 132. For example, as shown in FIGS. 4-6, side wall 224 may include a five-sided polygonal shape corresponding to the five-sided external shape of arm 132. In some embodiments, side wall 224 and arm 132 may have internal and external shapes, respectively, that are non-symmetrical so as to ensure the proper alignment and orientation of arm 132 within slot 220. The five-sided polygonal shape shown in FIGS. 4-6 is an example of one such non-symmetrical shape.

Figure 3:
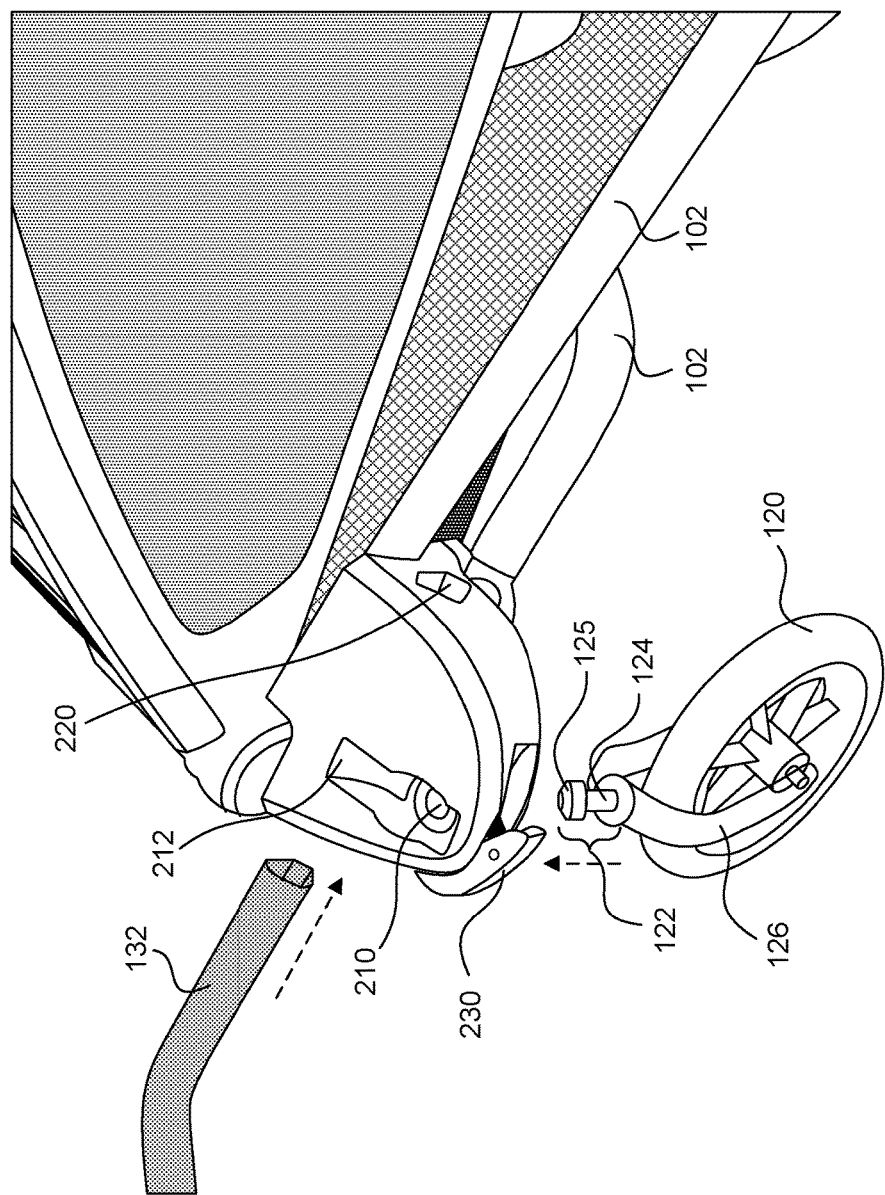
FIG. 3 shows a perspective view of an unassembled accessory connector according to an embodiment.

As shown, for example, in FIG. 3, accessory connector 200 may include a lever 230 configured to releasably lock arm 122 in slot 210 and releasably lock arm 132 in slot 220. In some embodiments, as described below in reference to FIGS. 4-6, lever 230 may be configured to simultaneously releasably lock arm 122 in first slot 210 and releasably lock arm 132 in second slot 220.

Lever 230 may include a free end 232 and an anchored or fixed end 234 pivotally connected to housing 202 at a pivot point 236. The pivotal connection of anchored end 234 allows lever 230 to rotate between at least a locked position and an unlocked position. In the unlocked position (as shown, for example, in FIG. 4), at least one of arm 122 and arm 132 is unlocked from slot 210 and slot 220, respectively. In the locked position (as shown, for example, in FIG. 6), at least one of arm 122 and arm 132 is locked within slot 210 and slot 220, respectively.

For the purposes of locking arm 122 of strolling wheel 120 within slot 210, lever 230 may include a first locking pin 250 connected to an interior surface 240 of lever 230. In some embodiments, first locking pin 250 may be directly connected to interior surface 240 using, for example, an adhesive, welding, a friction fit, or any combination thereof. In other embodiments, first locking pin 250 may be integrally formed on interior surface 240 (e.g., via an injection molding process) such that first locking pin 250 is formed integrally with lever 230. Lever 230 may also include a second locking pin 260 connected to interior surface 240 for locking arm 132 of support wheel 130 within slot 220. In some embodiments (e.g., as shown in FIGS. 4-6), second locking pin 260 may be connected to interior surface 240 via a coupling arm 266 that pivotally connects second locking pin 260 to lever 230. One end of coupling arm 266 may be fixedly connected to lever 230 at point 269 near free end 232 of lever 230. The other end of coupling arm 266 may be pivotally connected to second locking pin 260 via at a pivot point 268. Alternatively or additionally, coupling arm 266 may be pivotally connected to free end 232 at point 269.

As shown FIGS. 2 and 4, lever 230 may have an exterior surface 238 that conforms to an outer surface of housing 202 when lever 230 is in the locked position. For example, exterior surface 238 may be flush with an outer surface of housing 202 when lever 230 is in the locked position. As used herein, "flush" refers to two surfaces sharing the same geometric plane, at least at their edges. In some embodiments, the flush surfaces may be within a deviation of +/-1/16 of an inch. An exterior surface 238 that is flush with the outer surface of housing may prevent inadvertent unlocking of lever 230 (e.g., by snagging on an object passing connector 200). Also, it may increase the aesthetics and/or aerodynamics of accessory connector 200. In such an embodiment, housing 202 may include a cavity 208 for receiving at least a portion of lever 230 when lever 230 is in the locked position.

The operation of accessory connector 200 will now be described with reference to FIGS. 4-6 according to an embodiment. When lever 230 is in the unlocked position, accessory arm 132 may be inserted into open end 222 of slot 220, as shown in FIGS. 4 and 5. Since second locking pin 260 does not protrude into slot 220 when lever 230 is in the unlocked position, arm 132 is free to slide within slot 220. Arm 132 may be inserted into slot 220 such that a detent 134 on arm is aligned with second locking pin 260, as shown, for example, in FIG. 5. In some embodiments, slot 220 may include a surface feature located on a side wall 224 thereof. The surface feature may be located so as to engage end 136 of arm 132 and ensure that detent 134 aligns with second locking pin 260. In some embodiments, this surface feature may be a stop wall (e.g., the same as or similar to stop wall 326). In some embodiments, this surface feature may be a protrusion or skirt extending from side wall 224 towards the center of slot 220.

As also illustrated in FIGS. 4 and 5, first locking pin 250 may be disposed on lever 230 so as to not protrude into slot 210 when lever 230 is in the unlocked position. This allows arm 122 of strolling wheel 120 to be inserted into slot 210. In the unlocked position, arm 122 may be inserted into the top of slot 210 adjacent to top 206 of housing 202 or into the bottom of slot 210 adjacent to bottom 207 of housing 202. The embodiment shown in FIGS. 4-6 allows the simultaneous locking and unlocking of arms 122 and 132 within slots 210 and 220, respectively.

Once detent 134 is aligned with second locking pin 260, lever 230 may be actuated to cause second locking pin 260 to engage detent 134. When comparing FIGS. 4 and 6, it can be seen that second locking pin 260 moves within a passageway 264 formed within housing 202 when lever is rotated between the unlocked and locked positions. Passageway 264 is sized and shaped to allow second locking pin 260 and coupling 266 to move within housing 202. In the embodiment shown in FIGS. 4-6, as lever 230 is moved from the unlocked position to the locked position, the pivotal attachment of coupling arm 266 and second locking pin 260 allows second locking pin 260 to move in a direction perpendicular to slot 220. However, in some embodiments, second locking pin 260 and may move in a direction non-perpendicular to slot 220. In such embodiments, passageway 264 may also be oriented in a direction non-perpendicular to slot 220.

Figure 7:
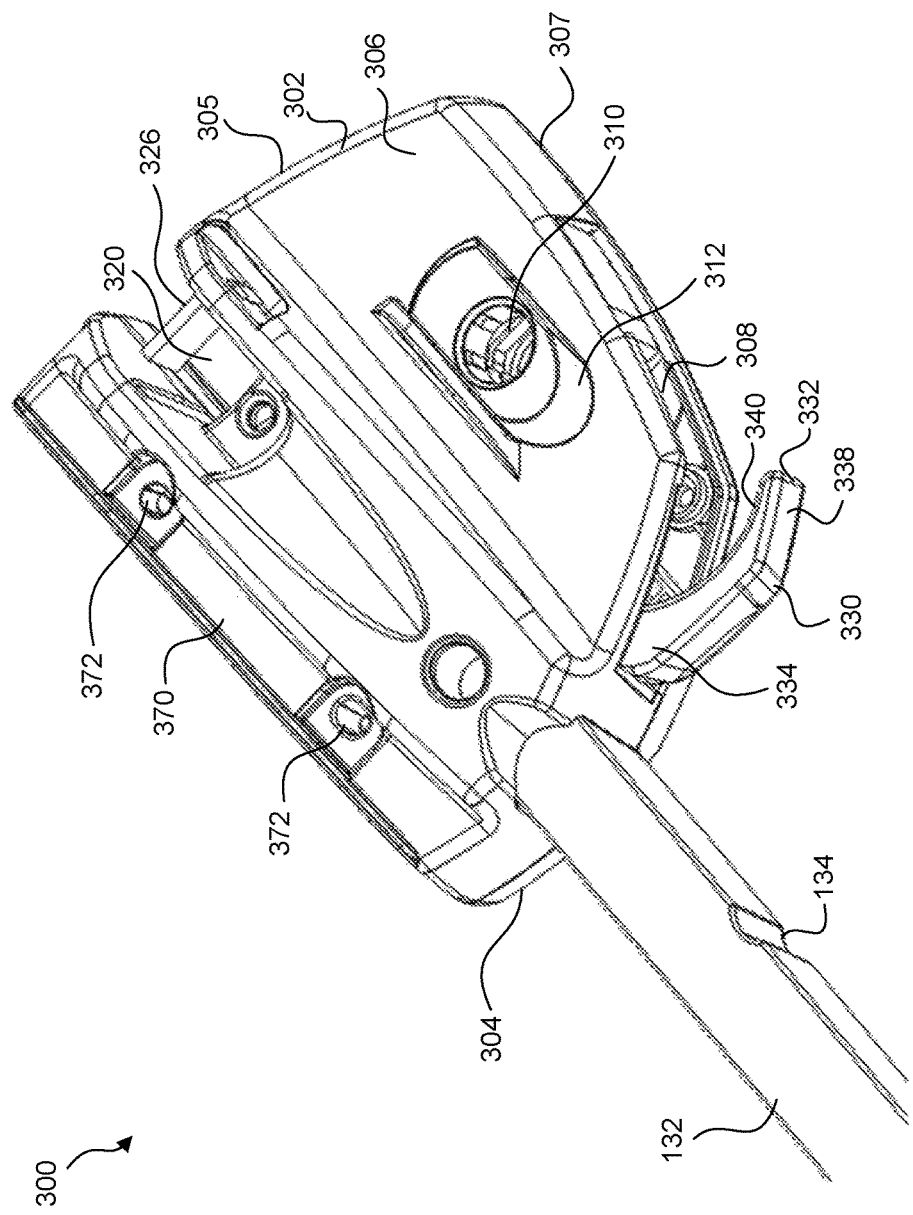
FIG. 7 shows a top perspective view of an accessory connector according to an embodiment.

When lever 230 is moved to the locked position, a locking end 262 of second locking pin 260 may protrude through an aperture 228 in side wall 224 of slot 220 and engage detent 134 on arm 132. Aperture 228 may be a though-hole in side wall 224 of slot 220 that is sized to receive locking end 262, thereby allowing locking end 262 to engage detent 134 on arm 132 when arm 132 is inserted into slot 220. The engagement between second locking pin 260 and detent 134 locks arm 132 within slot 220. In some embodiments, as shown, for example, in FIG. 5, detent 134 may be formed in a bottom surface of arm 132. In other embodiments, detent 134 may be formed in a top surface of arm 132 and/or may be formed as a through-hole in arm 132 such that second locking pin 260 extends through arm 132. In some embodiments, the size, shape, and/or location of detent 134 may depend on the configuration of second locking pin 260, passageway 264, and/or aperture 228. In some embodiments, detent 134 may be a recess in arm 132 (e.g., as shown in FIG. 7), rather than a through-hole or cut-out. In such embodiments, locking end 262 of second locking pin 260 may include a shape configured mate with the surface of detent 134 (e.g., similar to the shape of locking cam surface 362 shown in FIGS. 8A-C). A detent that is a recess may increase the strength of arm 132, relative to an arm having a through-hole or cut-out detent, by removing stress concentration areas on arm 132 (e.g., corners of the through-hole or cut-out).

As illustrated in FIGS. 4 and 6, a locking end 252 of first locking pin 250 may protrude into slot 210 through an aperture 218 when lever 230 is in the locked position. In the locked position, locking end 252 may engage a groove 124 located on arm 122 so as to lock arm 122 within slot 210. The engagement between locking end 252 and groove 124 may be the same as or similar to the engagement between locking end 262 of second locking pin 260 and detent 134.

In some embodiments, second locking pin 260 may force arm 132 against side wall 224 of slot 220 in addition to locking arm 132 in slot 220. In such embodiments, second locking pin 260 may reduce or prevent play between arm 132 and side wall 224 of slot 220. In other words, second locking pin 260 may prevent arm 132 from rattling within slot 220. This may be beneficial for various reasons. First, it may prevent undesirable wear and tear on arm 132 and/or slot 220. Second, it may increase the structural integrity of the attachment between accessory connector 200 and arm 132. Third, it may allow for the design tolerances of slot 220 and/or arm 132 to be relaxed. For example, if second locking pin 260 removes play within slot 220, a tight fit between side wall 224 and arm 132 may not be critical. This may allow arm 132 to be more easily inserted into and removed from second slot 220, thus making assembly and disassembly of support wheel 130 easier for a user. Also a relaxation in design tolerances may reduce manufacturing costs. In some embodiments, similar to second locking pin 260, first locking pin 250 force arm 122 of strolling wheel 120 against a side wall of slot 210 to remove play between slot 210 and arm 122.

Second locking pin 260 and detent 134 may be designed in various ways so as to force arm 132 against side wall 224 and remove play between arm 132 and side wall 224. For example, in embodiments having a detent 134 that is a cut-out (as shown, for example, in FIG. 5), second locking pin 260 may be wedge shaped with a thickness increasing from locking end 262 towards pivot point 268. In such embodiments, second locking pin 260 forces arm 132 upward (i.e., towards top 206 of housing 202) and into contact with side wall 224. As another example, in embodiments having a detent that is a recess (as shown, for example, in FIGS. 8A-8C), locking end 262 may force arm 132 in a horizontal direction (e.g., in a direction parallel to top 206 of housing 202) and into contact with side wall 224.

While lever 230 has been described as the actuator for locking arms 122 and 132 within slots 210 and 220 of accessory connector 300, other suitable actuators, such as buttons or switches, may be used to actuate locking pins 250 and 260. Additionally, while lever 230 is shown located on the side of housing 202, lever 230, or any other type of actuator, may be located at any position on accessory connector 200 that facilitates the movement of locking pins 250 and 260 into and out of slots 210 and 220, respectively.

FIGS. 7-9B show an accessory connector 300 according to another embodiment. Accessory connector 300 may include a housing 302 defining a first slot 310 and a second slot 320. Slot 310 may be configured to receive arm 122 of strolling wheel 120 and slot 320 may be configured to receive arm 132 of support wheel 130. Accessory connector 300 may be connected to frame 102 of transport vehicle 100 at a mounting area 370 via one or more mounting supports 272 located on housing 302. Mounting supports 372 may include any suitable mechanism for securing accessory connector 300 to frame 102 including, but not limited to friction fittings, screws, rivets, or adhesives. In some embodiments, accessory connector 300 may be welded to frame 102. In some embodiments, accessory connector 300 may be formed integrally with frame 102. For example, accessory connector 300 may be molded as part of frame 102. Housing 302 may comprise any suitable material, including but not limited to, a plastic, a metal (e.g., aluminum), a composite (e.g., a carbon fiber composite), or combinations thereof.

Slot 310 may be the same as or similar to slot 210 described above with respect to accessory connector 200. In some embodiments, as shown in FIG. 7, slot 310 may be a through-hole extending from a top 306 of housing 302 to a bottom 307 of housing 302. In some embodiments, top 306 and/or bottom 307 of housing 302 may include an indentation 312 surrounding slot 310. In such embodiments, indentation 312 may serve to properly position strolling wheel 120 on accessory connector 300 when arm 122 is inserted into slot 310. For example, indentation 312 may be sized and shaped to receive all or a portion of a mounting bracket 126 of strolling wheel 120.

Slot 320 may be the same as or similar to slot 220 described above with respect to accessory connector 200. Slot 320 may include an open end 322 located at a proximal end 304 of housing 302 and configured to receive arm 132 of support wheel 130. In some embodiments, slot 220 may include a stop wall 326 located near a distal end 305 of housing 302. Stop wall 326 may be attached to a side wall 324 of second slot 220 and may serve to properly align arm 132 within slot 320. In such an embodiment, arm 132 may be inserted into open end 322 of slot 320 until end 136 abuts stop wall 326 to ensure that detent 134 is aligned with a locking cam 360 of accessory connector 300.

Accessory connector 300 may include a lever 330 configured to releasably lock arm 132 in slot 320. Lever 330 may include a free end 332 and an anchored end 334 pivotally connected to housing 302 at a pivot point 336. The pivotal connection of anchored end 334 allows lever 330 to rotate between at least a locked position and an unlocked position. In the unlocked position (shown, for example, in FIG. 8B) arm 132 is unlocked from slot 320 and is allowed to move in and out of slot 320. In the locked position (shown, for example, in FIG. 8C), arm 132 may be locked within slot 320.

Similar to lever 230 discussed above, lever 330 may have an exterior surface 338 that conforms to an outer surface of housing 302 when lever 330 is in the locked position. In other words, exterior surface 338 may be flush with an outer surface of housing 302 when lever 330 is in the locked position. In such embodiments, housing 302 may include a cavity 308 shaped to receive at least a portion of lever 330 when lever 330 is in the locked position.

In operation, locking cam 360 of lever 330 locks and unlocks arm 132 from slot 320. Locking cam 360 includes a locking cam surface 362 configured to engage detent 134 on arm 132 when lever 330 is in the locked position, as shown, for example, in FIG. 8C. Locking cam 360 may be disposed on lever 330 such that at least a portion of locking cam 360, including locking cam surface 362, rotates in and out of an aperture 328 located on a side wall 324 of slot 320. Aperture 328 may be a though-hole in side wall 324 of slot 320 that is sized to receive a portion of locking cam 360, thereby allowing locking cam surface 362 to engage detent 134 on arm 132 when arm 132 is inserted into slot 320.

Figures 8A, 8B:
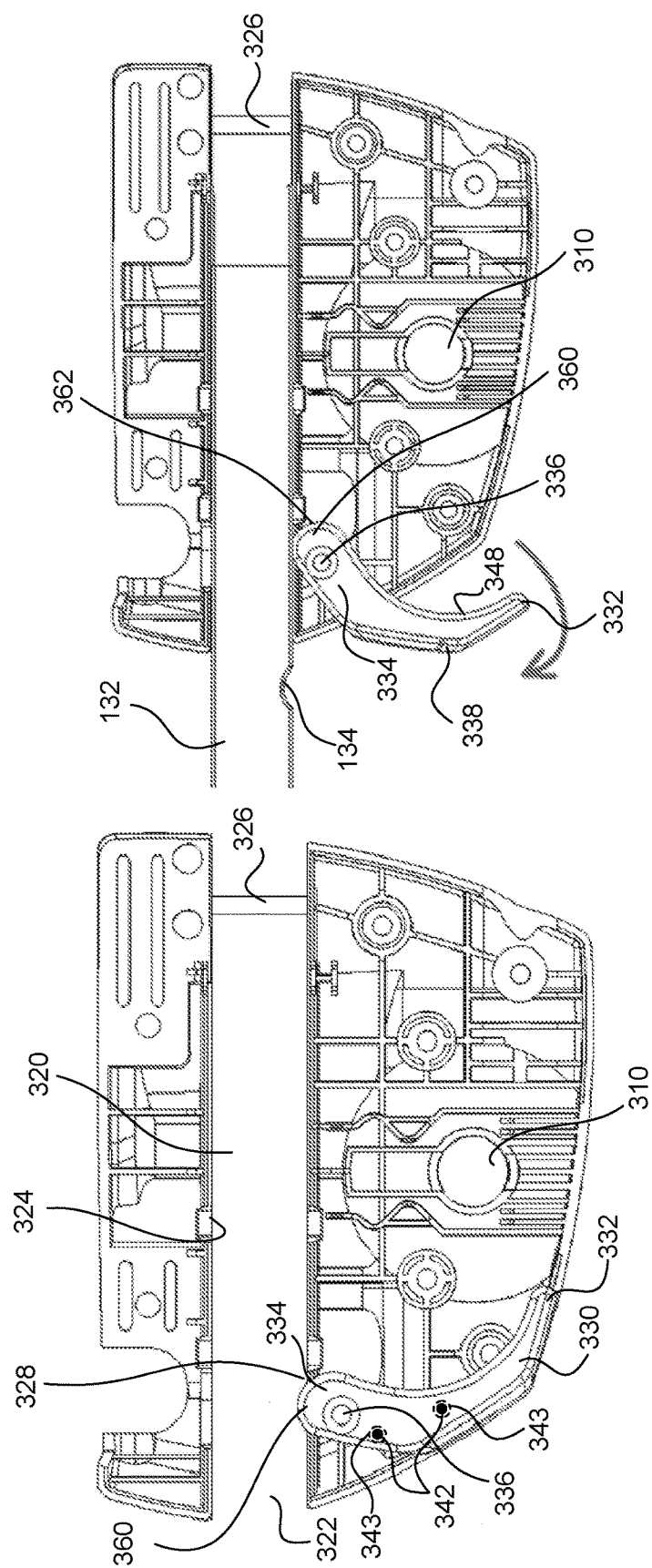

Locking cam 360 may be an integral part of lever 330. In some embodiments, as shown in FIGS. 8A-8C, locking cam 360 may form at least a portion of anchored end 334 of lever 330 and locking cam surface 362 may form a least a portion of the outer surface of lever 330. In some embodiments, locking cam 360 may a separate piece operatively connected to anchored end 334 of lever 330. For example, locking cam 360 and lever 330 may a similar configuration as the locking cam 460 and lever 430 described below in reference to FIGS. 10-11C. Locking cam surface 362 may a curved cross-sectional space in a direction perpendicular to pivot point 336, as shown in FIGS. 8A-8C. A curved locking cam surface 362 may facilitate the rotation of locking cam 360 into and out of aperture 328 on side wall 324.

In some embodiments, locking cam surface 362 may have a cross-sectional shape in a direction perpendicular to pivot point 336 having a circular curvature with a constant radius of curvature. In some embodiments, as shown, for example in FIGS. 8A-8C, the cross-sectional shape of locking cam surface 362 may be non-circular (i.e., having a non-constant radius of curvature). Preferably, locking cam surface 362 has a cross-sectional shape corresponding to the cross-sectional shape of detent 134 to ensure a secure and tight engagement between locking cam 360 and detent 134 when arm 132 is positioned in slot 320 and lever 330 is in the locked position (i.e., to ensure that locking cam surface 362 is fully seated within detent 134 when in the locked position).

The operation of accessory connector 300 will now be described with reference to FIGS. 8A-8C according to an embodiment. First, lever 330 is moved from the locked position (shown, for example, in FIG. 8A) to the unlocked position (shown, for example, in FIG. 8B). This rotation is shown as a clockwise rotation in FIGS. 8A and 8B and causes locking cam 360 to move out of aperture 328 in side wall 324. Once lever 330 is in the unlocked position, end 136 of arm 132 may be inserted into open end 322 of slot 320, past aperture 328, and towards stop wall 326. In some embodiments, end 136 of arm 132 may cause the rotation of lever 330 from the locked to the unlocked position by engaging locking cam surface 362 and forcing lever 330 to rotate clockwise. In such embodiments, accessory connector 300 may include an elastic member (e.g., the same as or similar to elastic member 380 shown in FIGS. 9A and 9B) for biasing lever 330 in the locked position. The use of elastic member 380 will cause lever 330 to automatically return to the locked position once detent 134 aligns with aperture 328 in sidewall 324 so that locking cam 360 may move into aperture 328 and engage detent 134.

Once arm 132 is properly aligned, lever 330 may be rotated counter-clockwise into the locked position (either automatically via an elastic member or manually) such that locking cam surface 362 engages detent 134 (as shown, for example, in FIG. 8C). The engagement between detent 134 and locking cam surface 362 locks arm 132 within second slot 320. As shown in FIG. 8C, locking cam surface 362 may have a cross-sectional size and shape that corresponds with the cross-sectional size and shape of detent 134 to ensure a tight fit between locking cam surface 362 and detent 134, thus securely locking arm 132 within slot 320.

In some embodiments, locking cam 360 may also force arm 132 against side wall 324 of slot 320. In such embodiments, locking cam 360 may reduce or prevent play within slot 320. In other words, locking cam 360 may prevent arm 132 from rattling within slot 320. Forcing arm 132 against side wall 324 may be achieved by positioning pivot point 336 and shaping locking cam surface 362 such that when lever 330 is in the locked position, locking cam 360 extends into slot 320 by a distance that is greater than the depth 135 of detent 134. Such a configuration will not only lock arm 132 within slot 320, but will also force arm 132 in a direction perpendicular to depth 135 such that arm 132 is forced against side wall 324.

In some embodiments, the configuration of lever arm 330 and slot 320 biases lever 330 towards the locked position when arm 132 is inserted into slot 320 and locking cam 360 engages detent 134. In such a configuration, any movement of arm 132 in a direction away from stop wall 326 (e.g., a pulling force on arm 132 in a removal direction) will increase the locking force placed on arm 132. In other words, end 136 of arm 132 may be biased towards stop wall 326. This may increase the safety of transport vehicle 100 by preventing inadvertent removal of arm 132 from slot 320.

When a user wishes to remove arm 132 from slot 320, the user may rotate lever 330 clockwise to the unlocked position, thereby removing locking cam 360 from aperture 328 and disengaging it from detent 134. In some embodiments, lever 330 may include one or more knobs 342 configured to engage corresponding recesses 343 located in cavity 308, or vice versa, to keep lever 330 in the unlocked position and/or the locked position.

FIGS. 9A and 9B show an embodiment of accessory connector 300 having a locking pin 350 configured to releasably lock arm 122 of strolling wheel 120 in slot 310. Locking pin 350 may be disposed on an interior surface 340 of lever 330. Locking pin 350 may be the same as or similar to first locking pin 250 of accessory connector 200. In embodiments including locking pin 350, lever 330 may be configured to simultaneously releasably lock arm 122 of strolling wheel 120 and arm 132 of support wheel 130 in slot 310 and slot 320, respectively. In some embodiments, as illustrated in FIGS. 9A and 9B, the location of slot 310 may be altered such that it is disposed near interior surface 340 of lever 330. In some embodiments, slot 310 may remain in the location shown in FIGS. 8A-8C and the configuration and/or location of locking pin 350 may be altered to allow locking pin 350 to lock arm 122 within slot 310. For example, locking pin 350 may be pivotally connected to lever 330 via a coupling that is the same as or similar to coupling 266 to facilitate locking arm 122 within slot 310.

In operation, a locking end 352 of locking pin 350 moves in and out of slot 310 to lock and unlock arm 122. As shown in FIG. 9A, when lever 330 is in the locked position, locking end 352 protrudes into slot 310. In this position, locking end 352 may engage groove 124 on arm 122 to lock arm 122 within slot 310. When lever 330 is moved to the unlocked position, as shown in FIG. 9B, locking end 352 is removed from slot 310 so that arm 122 may be inserted into or removed from slot 310. In some embodiments, locking end 352 may include a ramped surface that interfaces with a ramped end surface 125 of arm 122 to facilitate engagement of locking end 352 and groove 124. Ramped end surface 125 of arm 122 may cause the rotation of lever 330 from the locked to the unlocked position by pushing the ramped surface of locking end 352 out of slot 310. In such embodiments, accessory connector 300 may include elastic member 380 for biasing lever 330 in the locked position. Elastic member 380 may cause lever 330 to automatically return to the locked position once groove 124 and locking end 352 are aligned and locking end 352 is seated in groove 124. Elastic member 380 may be, but is not limited to, a spring.

FIGS. 10-12B show an accessory connector 400 according to another embodiment. Accessory connector 400 may include a housing 402 defining a first slot 410 and a second slot 420. Slot 410 may be configured to receive arm 122 of strolling wheel 120 and slot 420 may be configured to receive arm 132 of support wheel 130. Accessory connector 400 may be connected to frame 102 of transport vehicle 100 at a mounting area 470. Mounting area 470 may include any suitable mechanism for securing accessory connector 400 to frame 102 including, but not limited to friction fittings, screws, rivets, or adhesives. In some embodiments, accessory connector 400 may be welded to frame 102. In some embodiments, accessory connector 400 may be formed integrally with frame 102. For example, accessory connector 400 may be molded as part of frame 102. Housing 402 may comprise any suitable material, including but not limited to, a plastic, a metal (e.g., aluminum), a composite (e.g., a carbon fiber composite), or combinations thereof. Housing 402 may also include a cavity 408 shaped to receive at least a portion of a lever 430 to allow lever 430 to rotate between a locked position and an unlocked position. A user may rotate lever 430 between the locked and unlocked positions by pressing on an exterior surface 438 of lever 430.

Figure 10:
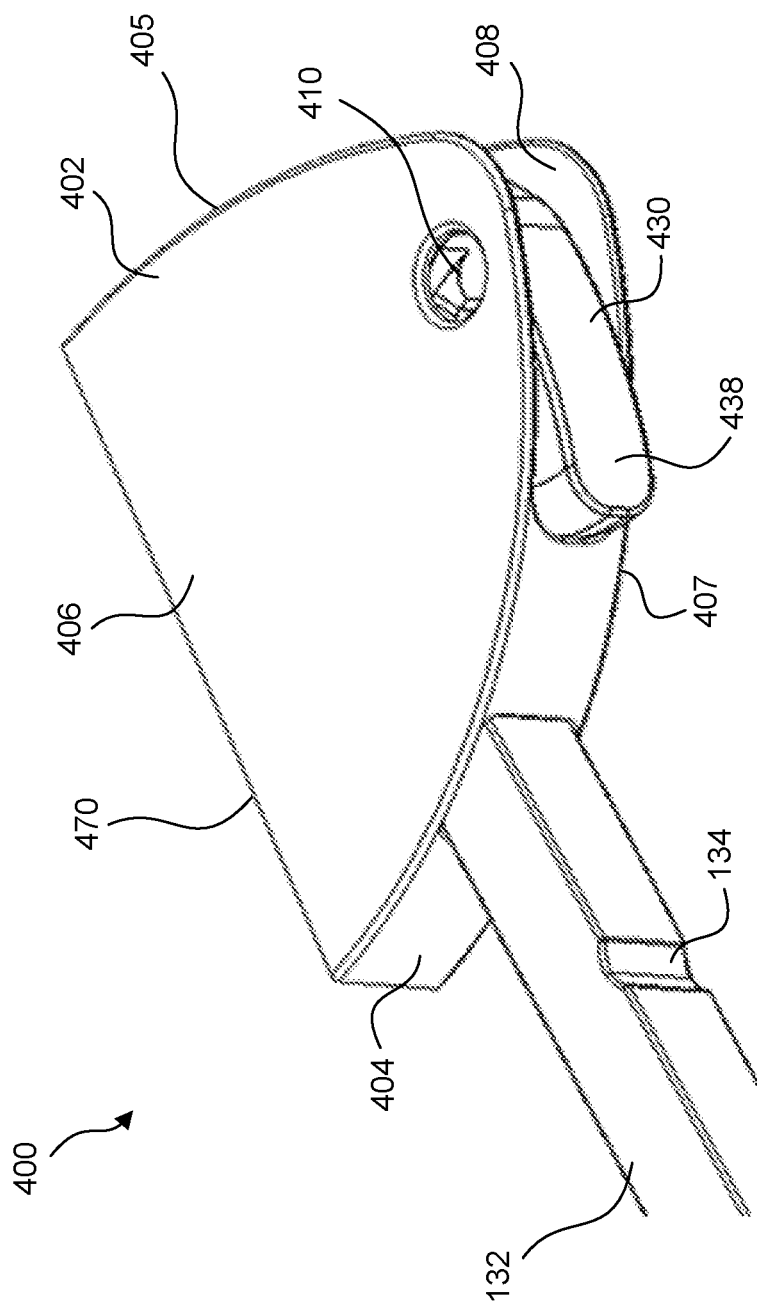
FIG. 10 shows a top perspective view of an accessory connector according to an embodiment.
Figure 11C:
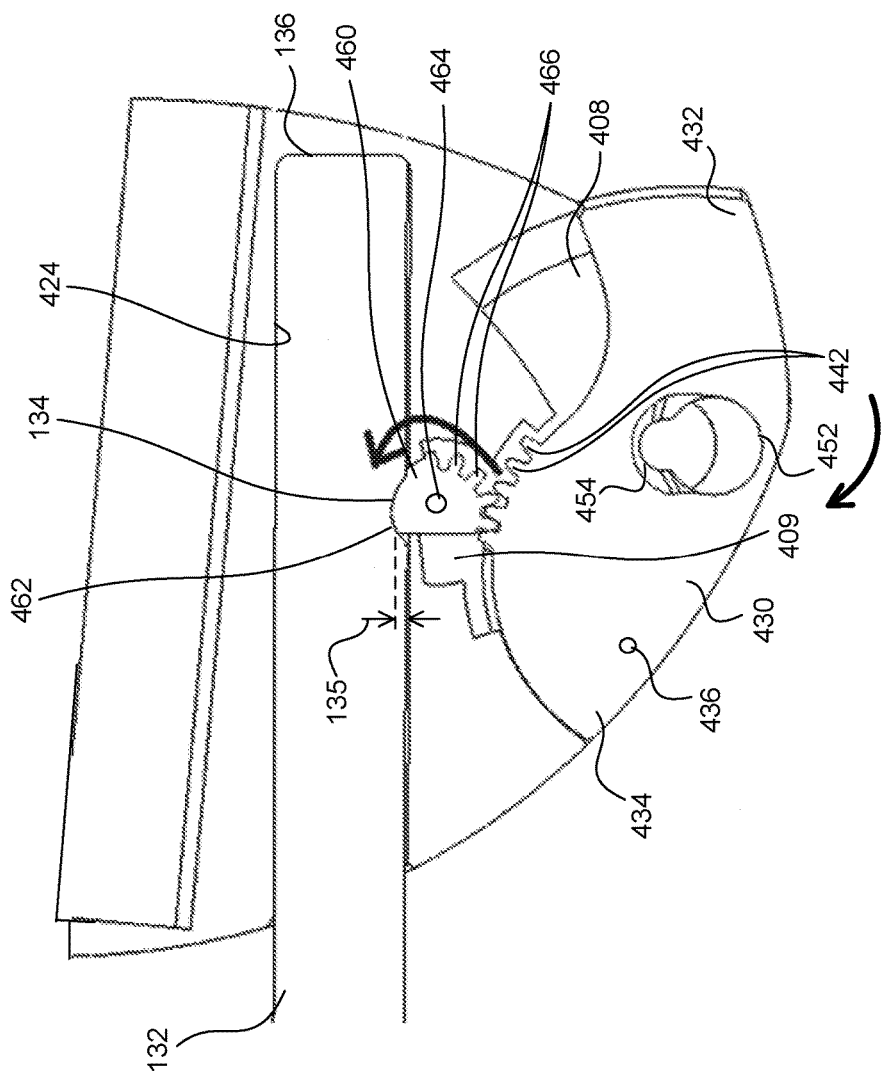

Slot 410 may be the same as or similar to first slot 210 described above with respect to accessory connector 200. In some embodiments, as illustrated in FIGS. 10-11C, slot 410 may be a through-hole extending from a top 406 of housing 402 to a bottom 407 of housing 402. In some embodiments, top 406 and/or bottom 407 of housing 402 may include an indentation similar to indentation 212 surrounding first slot 410. In such embodiments, the indentation may serve to properly position strolling wheel 120 on accessory connector 400 when arm 122 is inserted into slot 410. For example, the indentation may be sized and shaped to receive all or a portion of a mounting bracket 126 of strolling wheel 120.

Slot 420 may be the same as or similar to slot 220 described above with respect to accessory connector 200. In some embodiments, as shown in FIGS. 11A and 11B, slot 420 may be an elongated opening extending from a proximal end 404 housing 402 towards a distal end 405 of housing 402. Slot 420 may include an open end 422 located at proximal end 404 of housing 402 and configured to receive arm 132 of support wheel 130. Slot 420 may also include a closed end 426 located near distal end 405 of housing 402. Closed end 426 may function in a similar manner as stop wall 326. The location of closed end 426 (i.e., the depth of slot 420) may serve to properly align arm 132 within slot 420 to ensure that detent 134 is aligned with a locking cam 460 of accessory connector 400 when end 136 of arm abuts closed end 426.

As illustrated in FIGS. 11A-11C, lever 430 may be configured to releasably lock arm 132 in slot 420. Lever 430 may include a free end 432 and an anchored end 434 pivotally connected to housing 402 at a pivot point 436. The pivotal connection of anchored end 434 allows lever 430 to rotate between locked and unlocked positions. In the unlocked position (shown, for example, in FIG. 11B), arm 132 is unlocked from slot 420 and is allowed to move in and out of slot 420. In the locked position (shown, for example, in FIG. 11C) arm 132 is locked within slot 420.

Accessory connector 400 may also include a locking cam 460 that is pivotally connected to housing 402 at pivot point 464. A recess 409 formed within housing 402 may allow locking cam 460 to freely rotate about pivot point 464. In some embodiments, recess 409 may be part of cavity 408. Locking cam 460 includes a locking cam surface 462 configured to engage detent 134 in arm 132 when lever 430 is in the locked position. Locking cam 460 may be rotatable about pivot point 464 such that at least a portion of locking cam 460, including locking cam surface 462, rotates in and out of an aperture 428 located on a side wall 424 of slot 420. Aperture 428 may be a though-hole in side wall 424 of slot 420 that is sized to receive a portion of locking cam 460, thereby allowing locking cam surface 462 to engage detent 134 on arm 132 when arm 132 is inserted into slot 420.

In some embodiments, locking cam surface 462 may have a cross-sectional shape in a direction perpendicular to pivot point 436 having a circular curvature with a constant radius of curvature. In some embodiments, as shown, for example in FIGS. 11A-11C, the cross-sectional shape of locking cam surface 462 may be non-circular (i.e., having a non-constant radius of curvature). Preferably, locking cam surface 462 has a cross-sectional shape that corresponds to the cross-sectional shape of detent 134 to ensure proper engagement between locking cam 460 and detent 134 when lever 430 is in the locked position (i.e., to ensure that locking cam surface 462 is fully seated within detent 134 when in the locked position).

Locking cam 460 may also include teeth 466. In some embodiments, teeth 466 may be radially disposed about pivot point 464. As described below in greater detail, teeth 466 may be configured to engage corresponding teeth 442 located on an interior surface 440 of lever 430. The engagement between teeth 466 and teeth 442 allows lever 430 to rotate locking cam 460 about pivot point 464 to thereby lock and unlock arm 132 within slot 420. While the engagement between lever 430 and locking cam 460 is shown and described as being an engagement between corresponding teeth, any suitable frictional engagement between lever 430 and locking cam 460 may be used. For example, lever 430 and locking cam 460 may include rough or patterned surfaces that frictionally engage each other and allow lever 430 to rotate locking cam 460, and vice versa.

In some embodiments, lever 430 may also include a lock 450 configured to releasably lock arm 122 of strolling wheel 120 within slot 410. Lock 450 may be a through-hole having a large opening 452 and a small opening 454. Large opening 452 may have cross-sectional area that is larger than the cross-sectional area of arm 122 so that arm 122 can be inserted into and removed from slot 410. Small opening 454 may have a semicircular cross-section with a radius equal to or slightly larger than the radius of groove 124 on arm 122. In embodiments including lock 450, lever 430 may be configured to simultaneously releasably lock arm 122 of strolling wheel 120 and arm 132 of support wheel 130 in slot 410 and slot 420, respectively. The operation of lock 450 is described below with reference to FIGS. 12A and 12B. While lock 450 is shown and described as a through-hole with small and large openings, lock 450 may alternatively or additionally include a locking pin (e.g., the same as or similar to locking pin 250) for releasably locking arm 122 within slot 410.

FIGS. 11A-11C illustrate the releasable locking of arm 132 within slot 420. First, lever 430 is moved from the locked position (shown, for example, in FIG. 11A) to the unlocked position (shown, for example, in FIG. 11B). This rotation is shown as a counter-clockwise rotation of lever 430 in FIGS. 11A and 11B. The counter-clockwise rotation of lever 430 in turn causes locking cam 460 to rotate clockwise, thereby removing locking cam 460 from aperture 428 in side wall 424. Once lever 430 is in the unlocked position, end 136 of arm 132 may be inserted into open end 422 of slot 420, past aperture 428, and towards closed end 426 of slot 420. In some embodiments, end 136 of arm 132 may cause the rotation of lever 430 from the locked position to the unlocked position by engaging locking cam surface 462, which in turn forces lever 430 to rotate counter-clockwise. In such embodiments, accessory connector 400 may include an elastic member (e.g., the same as or similar to elastic member 480 shown in FIGS. 12A and 12B) for biasing lever 430 in the locked position. The use of elastic member 480 will cause lever 430 to automatically return to the locked position once detent 134 aligns with aperture 428 in side wall 424 so that locking cam 460 may move into aperture 428 and engage detent 134.

Once arm 132 is properly aligned and lever 430 is rotated clockwise into the locked position (either automatically via an elastic member or manually) locking cam 460 engages detent 134 (see FIG. 11C). The engagement between detent 134 and locking cam surface 462 locks arm 132 within slot 420. As shown in FIG. 11C, locking cam surface 462 may have a cross-sectional size and shape that corresponds with the cross-sectional size and shape of detent 134 to ensure a tight fit between locking cam surface 462 and detent 134, thus securely locking arm 132 within slot 420.

In some embodiments, locking cam 460 may additionally force arm 132 against side wall 424 of slot 420. In such embodiments, locking cam 460 may reduce or prevent play within slot 420. In other words, locking cam 460 may prevent arm 132 from rattling within slot 420. Forcing arm 132 against side wall 424 may be achieved by positioning pivot point 464 and shaping locking cam surface 462 such that when lever 430 is in the locked position, locking cam 460 extends into slot 420 by a distance that is greater than the depth 135 of detent 134. Such a configuration will not only lock arm 132 within slot 420, but will also force arm 132 in a direction perpendicular to depth 135 such that arm 132 is forced against side wall 424.

In some embodiments, the configuration lever 430 and locking cam 460 biases lever 430 towards the locking position when arm 132 is inserted into slot 420 and locking cam 460 engages detent 134. In such a configuration, any movement of arm 132 in a direction away from closed end 426 (e.g., a pulling force on arm 132 in a removal direction) will increase the locking force placed on arm 132. In other words, end 136 of arm 132 may be biased towards closed end 428 of slot 420. This may be achieved by configuring lever 430 and locking cam 460 to rotate in opposite directions during locking and unlocking (e.g., the counter-clockwise movement of lever 430 and the clockwise movement of locking cam 460 during unlocking illustrated in FIGS. 11A and 11B). This increase in locking force placed on arm 132 during an inadvertent removal event may increase the safety of transport vehicle 100.

When a user wishes to remove arm 132 from slot 420, the user may rotate lever 430 counter-clockwise to the unlocked position, thereby removing locking cam 460 from aperture 428 and disengaging it from detent 134. In some embodiments, lever 430 may include one or more knobs (e.g., the same as or similar to knobs 342 on lever 330) configured to engage corresponding recesses located in cavity 408 to keep lever 430 in the unlocked position and/or the locked position. In some embodiments, the knobs may alternatively be recesses that engage corresponding knobs located in cavity 408.

FIGS. 12A and 12B illustrate the operation of lock 450 for releasably locking arm 122 of strolling wheel 120 in slot 410. In operation, small opening 454 of lock 450 moves in and out of slot 410 to lock and unlock arm 122. As shown in FIG. 12A, when lever 430 is in the unlocked position, small opening 454 does not occupy slot 410. In this position, arm 122 of strolling wheel may be inserted into or removed from large opening 452 and slot 410. When lever 430 is moved to the locked position, as shown in FIG. 12B, small opening 454 moves into slot 410 to engage groove 124 on arm 122. The engagement between small opening 454 and groove 124 locks arm 122 within slot 410.

In some embodiments, small opening 454 may include a ramped surface that interfaces with ramped end surface 125 of arm 122 to allow for automatic engagement of locking end small opening 454 and groove 124. Ramped end surface 125 of arm 122 may cause the rotation of lever 430 from the locked to the unlocked position by pushing the ramped surface of small opening 454 out of slot 410. This will allow arm 122 to be inserted into slot 410 through large opening 452. In such embodiments, accessory connector 400 may include elastic member 480 for biasing lever 430 in the locked position. Elastic member 480 may cause lever 430 to automatically return to the locked position once groove 124 and small opening 454 are aligned and small opening 454 is seated in groove 124. Elastic member 480 may be, but is not limited to a spring. When a user wishes to remove strolling wheel from accessory connector 400, the user may rotate layer 430 the unlocked position, thereby removing small opening 454 from slot 410 and allowing arm 122 to be removed.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A child transport vehicle, comprising:
   a vehicle frame;
   an accessory connector attached to the vehicle frame, the accessory connector comprising:
      a first slot configured to receive a portion of a first accessory;
      a second slot configured to receive a portion of a second accessory; and
      a single actuator configured to releasably lock both the portion of the first accessory in the first slot and the portion of the second accessory in the second slot.

2. The child transport vehicle of claim 1, wherein the actuator is configured to simultaneously releasably lock the portion of the first accessory in the first slot and releasably lock the portion of the second accessory in the second slot.

3. The child transport vehicle of claim 1, wherein the actuator comprises a lever having an anchored end pivotally attached to the accessory connector about a pivot point and a free end.

4. The child transport vehicle of claim 3, wherein the lever is configured to rotate about the pivot point between a first position and a second position; and
   wherein the lever is configured to lock the portion of the first accessory in the first slot and the portion of the second accessory in the second slot when the lever is in the first position.

5. The child transport vehicle of claim 3, wherein the lever comprises a first locking pin configured to releasably lock the portion of the first accessory in the first slot and a second locking pin configured to releasably lock the portion of the second accessory in the second slot.

6. The child transport vehicle of claim 5, wherein the second locking pin is connected to the lever via a coupling.

7. The child transport vehicle of claim 6, wherein the coupling is pivotally connected to the second locking pin.

8. The child transport vehicle of claim 5, wherein the first slot comprises a first aperture configured to receive a portion of the first locking pin and the second slot comprises a second aperture configured to receive a portion of the second locking pin.

9. A child transport vehicle, comprising:
   a vehicle frame; and
   an accessory connector attached to the vehicle frame, the accessory connector comprising:
      a housing defining a first slot configured to receive a portion of a first accessory,
      a lever assembly pivotally connected to the housing and configured to releasably lock the portion of the first accessory in the first slot, the lever assembly comprising a lever and a locking cam,
   wherein the lever is configured to rotate between a first position and a second position,
   wherein the locking cam is configured to protrude into the first slot when the lever is in the first position so as to lock the portion of the first accessory in the first slot,
   wherein the locking cam is configured to force the portion of the first accessory against the housing when the lever is in the first position to thereby stabilize the first accessory,
   wherein the housing further defines a second slot configured to receive a portion of a second accessory, and
   wherein the lever assembly further comprises a lock configured to releasably lock the portion of a second accessory in the second slot.

10. The child transport vehicle of claim 9, wherein the locking cam is configured to move out of the first slot when the lever is in the second position so as to unlock the portion of the first accessory in the first slot.

11. The child transport vehicle of claim 9, wherein the lever assembly further comprises an elastic member configured to bias the lever in the first position.

12. The child transport vehicle of claim 9, wherein the lever assembly further comprises one or more knobs configured to engage one or more recesses disposed on the housing when the lever is in the first position.

13. The child transport vehicle of claim 9, wherein the locking cam is configured to engage a detent in the portion of the first accessory when the first accessory is received in the first slot and the lever is in the first position.

14. The child transport vehicle of claim 13, wherein the engagement between the locking cam and the detent biases the lever towards the first position and biases an end of the portion of the first accessory towards a stop wall of the first slot, and
   wherein movement of the end of the portion of the first accessory away from the stop wall increases the bias of the lever towards the first position.

15. The child transport vehicle of claim 9, wherein the locking cam is integrally formed with the lever and defines at least a portion of the lever.

16. The child transport vehicle of claim 9, wherein the lever is pivotally connected to the housing about a first pivot point and the locking cam is pivotally connected to the housing about a second pivot point.

17. The child transport vehicle of claim 16, wherein the locking cam is a geared locking cam having a first set of teeth and the lever comprises a second set teeth configured to engage the first set of teeth on the geared locking cam, and
   wherein the lever is configured to actuate the geared locking cam by rotating between the first and second positions.

18. A child transport vehicle, comprising:
   a vehicle frame defining a cargo area having a child passenger seat; and
   an accessory connector attached to the vehicle frame, the accessory connector comprising:

a housing defining a first slot having a side wall configured to receive a portion of a first accessory and a second slot configured to receive a portion of a second accessory; and a lever comprising a first lock configured to releasably lock the portion of the first accessory in the first slot and a second lock configured to releasably lock the portion of the second accessory in the second slot, wherein the lever is configured to rotate between a first position and a second position, and wherein the first lock is configured to force the portion of the first accessory against the side wall of the first slot when the lever is in the first position to thereby stabilize the first accessory.

19. A child transport vehicle, comprising:

a vehicle frame;

an accessory connector attached to the vehicle frame, the accessory connector comprising:
- a first slot configured to receive a portion of a first accessory;
- a second slot configured to receive a portion of a second accessory; and
- an actuator configured to simultaneously releasably lock the portion of the first accessory in the first slot and releasably lock the portion of the second accessory in the second slot.

20. The child transport vehicle of claim 19, wherein the actuator comprises a lever having an anchored end pivotally attached to the accessory connector about a pivot point and a free end.

* * * * *